United States Patent Office 3,721,736
Patented Mar. 20, 1973

3,721,736
CERTAIN PHOSPHATES AND THEIR UTILIZATION AS FUNGICIDES
Hironari Sugiyama, Shimizu, Eiichi Yoshinaga, Fujieda, and Hideo Itoh, Shimizu, Japan, assignors to Kumiai Chemical Industry Co., Ltd., Tokyo, Japan
No Drawing. Filed July 6, 1970, Ser. No. 52,679
Claims priority, application Japan, July 10, 1969, 44/54,151
Int. Cl. A01n 9/36
U.S. Cl. 424—217     6 Claims

ABSTRACT OF THE DISCLOSURE

A method controlling and killing fungi, insects and mites in agriculture and horticulture by using a lethally effective amount of the compound of the formula

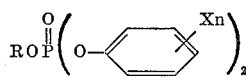

wherein R is an alkyl group substituted with at least one of the groups selected from the group consisting of halogen atom, cyano group, thiocyano group and alkoxy group, X is selected from the group consisting of hydrogen atom, halogen atom and alkyl group and $n$ is an integer of 1 to 5, in combination with an inert carrier.

---

The present invention relates to fungicidal, insecticidal and miticidal compositions containing novel O-substituted alkyl O,O-di-(substituted phenyl)phosphates having the general formula

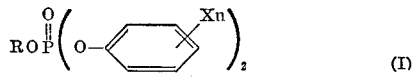  (I)

wherein R is an alkyl group substituted with halogen atoms, cyano groups, thiocyano groups or alkoxy groups, X is hydrogen atoms, halogen atoms or alkyl groups and $n$ is an integer of 1 to 5, as an active ingredient and method for using these compositions.

The compounds having the above described general Formula I are novel compounds which have never been disclosed in any prior literatures and are effective for preventing fungi and bacteria, such as rice blast *Pyricularia oryzae*), sheath blight (*Pellicularia sasaki*), helminthosporium leaf spot (*Cochliobolus miyabeanus*), bacterial leaf blight (*Xanthomonas oryzae*) and the like and also are active for preventing white backed plant hopper, brown plant hopper and green rice leaf hopper and can be used as fungicidal, insecticidal and miticidal compositions. Accordingly, the present invention provides substances useful for preventing harmful fungi and insects in agricultural products.

Heretofore, as fungicidal compositions for rice blast, organomercury compositions have been used, and these compositions have a high fungicidal activity, while they have a high toxicity against human body and if they enter into human body, they are not excreted and accumulate in the human body to cause a chronic poisoning and therefore non-mercury series fungicides have been recently demanded. As the non-mercury series fungicides there are organophosphorus series compounds, organochlorine series compounds and antibiotics and the like. Among them the organochlorine series compounds show excellent protective effect, but some of these compounds remain in plants for a long time after spread the composition and are not preferable as the pesticides. Furthermore, some of these compounds are liable to cause phytotoxicity and from this point compositions for preventing rice blast substituting for the organochlorine series compounds have been strongly demanded.

The compounds according to the present invention show an excellent activity against particularly rice blast and bacterial leaf blight and further have no phytotoxicity on rice plant and therefore they are ideal compositions substituting for the organochlorine series compositions and simultaneously show the activities of insecticidal and miticidal compositions.

Method for producing the compounds of the present invention is shown by the following reaction formulae:

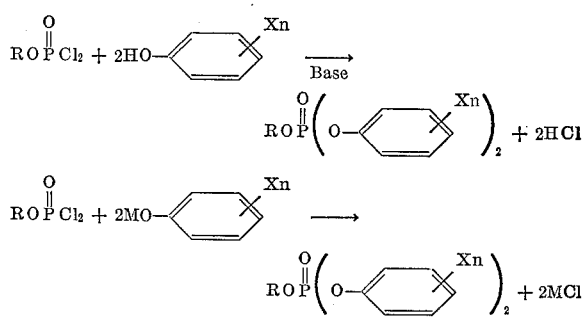

In the above formulae, R, X, $n$ have the above described meanings and M represents alkali metal atoms, such as sodium, potassium and the like. When these reactions are carried out in a solvent inert to substituted-alkyl dichlorophosphate by using a dehydrohalogenating agent at a temperature from about $-30°$ C. to the boiling point of the solvent, the object product can be easily obtained in a high yield.

In the practice of the method of producing the compounds of the present invention, aromatic hydrocarbons, such as, benzene, toluene, xylene, etc.; aliphatic hydrocarbons, such as, ligroin, petroleum benzene, n-hexane, etc.; halogenated hydrocarbons, such as, carbon tetrachloride, dichloromethane, dichloroethane, etc.; ketone series solvents, nitrile series solvents may be used as the reaction solvent and also the mixture of these solvents may be used.

As bases to be used as the dehalogenating agent, mention may be made of trimethylamine, triethylamine, N,N-dimethylaniline, N,N-diethylamine, pyridine, sodium carbonate, potassium carbonate, sodium hydrogen carbonate, etc.

An explanation will be made with respect to examples for producing the compounds of the present invention hereinafter, which are not limitative to the scope of the invention.

EXAMPLE 1

Prduction of O-2′-chloroethyl O,O-bis-(2,4-dimethylphenyl) phosphate

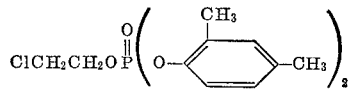

13.6 g. (0.07 mole) of O-2-chloroethyl dichlorophosphate and 17.0 g. (0.14 mole) of 2,4-dimethylphenol was dissolved in 200 ml. of benzene and 14.2 g. (0.14 mole) of triethylamine was added dropwise gradually thereto, while stirring below 0° C. Thereafter, the stirring was continued under the same condition for some time and further at 50 to 60° C. for 3 hours. After left to stand for over a night, the reaction mixture was washed with water and further with a diluted alkali solution and then the organic layer was separated from the mixture. This organic layer was dried with an anhydrous sodium sulfate, concentrated and then purified by vacuum distillation to obtain 18 g. of a colourless and transparent liquid having a boiling point of 168 to 172° C./0.004 mm. Hg and $n_D^{20}$ of 1.5355. The yield was 69.8% of the theoretical value.

EXAMPLE 2

Production of O-2',2',2'-trichloroethyl O,O-bis-(4-chlorophenyl) phosphate

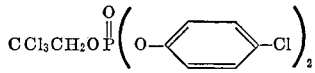

11.71 g. of O-2,2,2-trichloroethyl dichlorophosphate and 12.86 g. of p-chlorophenol were dissolved in 200 ml. of xylene and 10.12 g. of triethylamine was added dropwise gradually thereto, while cooling with water and stirring. Thereafter, the stirring was continued under the same condition for some time and further at 50 to 60° C. for 3 hours. The reaction mixture was reached with water and further with a diluted alkali solution and then the organic layer was separated from the mixture. This organic layer was dried with an anhydrous sodium sulfate, concentrated and then purified by vacuum distillation to obtain 20.5 g. of colourless and transparent liquid having a boiling point of 184 to 187° C./0.003 mm. Hg and $n_D^{20}$ of 1.5600. The yield was 96.5% of the theoretical value.

EXAMPLE 3

Production of O-1',3'-dichloro-(2')-propyl O,O-bis-(2,4-dichlorophenyl) phosphate

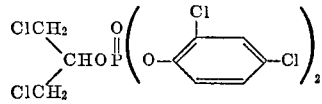

To a mixed solution of 12.30 g. of O-1,3-dichloro-(2)-propyl dichlorophosphate and 16.2 g. of 2,4-dichlorophenol in 300 ml. of chloroform was added dropwise gradually 8 g. of pyridine, while stirring at room temperature. Then, the stirring was continued under the same condition for some time and further at 50 to 60° C. for 4 hours. After left to stand over a night, the reaction mixture was washed with water and further with a diluted alkali solution an then the organic layer was separated from the mixture. This organic layer was dried with anhydrous sodium sulfate and then purified by vacuum distillation to obtain 20 g. of a colourless and transparent liquid having a boiling point of 200 to 210° C./0.004 mm. Hg and $n_D^{20}$ of 1.5737. The yield was 80% of the theoretical value.

EXAMPLE 4

Production of O-2'-chloroethyl O,O-bis-(2,4-dichloro-6-methylphenyl) phosphate

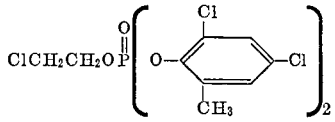

To a mixed solution of 13.80 g. of O-2-chloroethyl dichlorophosphate and 24.7 g. of 2,4-dichloro-6-methylphenol in 200 ml. of benzene was added dropwise gradually 14.17 g. of triethylamine, while cooling with water and stirring. Thereafter, the stirring was continued under the same condition for some time and further at 50 to 60° C. for 3 hours. After left to stand over a night, the reaction mixture was washed with water and further with a diluted alkali solution and then the organic layer was separated from the mixture. This organic layer was dried and concentrated, whereafter the resulting residue was crystallized by cooling. The reaction product was a white needle crystal with a yield of 28 g. and a melting point of 103 to 104° C. The yield was 92.5% of theoretical value.

EXAMPLE 5

Production of O-2'-ethoxyethyl O,O-diphenyl phosphate

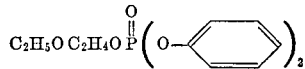

To a mixed solution of 20.7 g. of O-2-ethoxyethyl dichlorophosphate and 18.2 g. of phenol in 200 ml. of toluene was added dropwise gradually 22.38 g. of triethylamine, while cooling with water. Then, the stirring was continued under the same condition for some time and further at 50 to 60° C. for 4 hours. After left to stand over a night, the reaction mixture was washed with water and further with a diluted alkali solution and then the organic layer was separated from the mixture. This organic layer was dried and concentrated, whereafter the resulting residue was purified by vacuum distillation to obtain 26 g. of a colourless and transparent liquid having a boiling point of 165 to 172° C./0.008 mm. Hg and $n_D^{20}$ of 1.5218. The yield was 80.7% of the theoretical value.

EXAMPLE 6

Production of O-2'-cyanoethyl O,O-diphenylphosphate

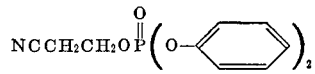

To a mixed solution of 9.4 g. of O-2-cyanoethyl dichlorophosphate and 9.41 g. of phenol in 200 ml. of benzene was added dropwise gradually 10.12 g. of triethylamine, while cooling with water. Thereafter, the stirring was continued under the same condition for some time and further at 50 to 60° C. for 4 hours. After left to stand over a night, the reaction mixture was washed with water and further with a diluted alkali solution. Then, the resulting organic layer was dried with anhydrous sodium sulfate and concentrated, whereafter the resulting residue was purified by vacuum distillation to obtain 10 g. of a colourless and transparent liquid having a boiling point of 175 to 180° C./0.018 mm. Hg and $n_D^{23.8}$ of 1.5335. The yield was 66% of the theoretical value.

EXAMPLE 7

Production of O-2'-bromoethyl O,O-bis-(2,4-dichlorophenyl) phosphate

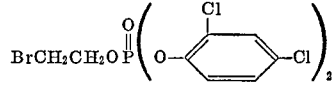

12.09 g. of O-2-bromoethyl dichlorophosphate and 16.2 g. of 2,4-dichlorophenol were dissolved in 200 ml. of benzene and 10.12 g. of triethylamine was added dropwise gradually thereto, while cooling with water. Thereafter, the stirring was continued under the same condition for some time and further at 50 to 60° C. for 9 hours. After left to stand over a night, the reaction mixture was washed with water and further with a diluted alkali solution and then the organic layer was separated from the mixture. This organic layer was dried with anhydrous sodium sulfate and concentrated, whereafter the resulting residue was purified by vacuum distillation to obtain 22.6 g. of a colourless and transparent liquid having a boiling point of 198 to 200° C./0.005 mm. Hg and $n_D^{20}$ of 1.5795. The yield was 91.3% of the theoretical value.

EXAMPLE 8

Production of O-1',3'-dichloro-(2')-propyl O,O-bis-(pentachlorophenyl) phosphate

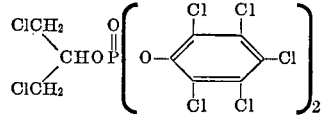

28.8 g. of sodium pentachlorophenolate was mixed with 300 ml. of acetone and 6.2 g. of O-1,3-dichloro-(2)-proply dichlorophosphate was added dropwise gradually thereto, while stirring at room temperature. Thereafter, the resulting mass was heated to 50 to 60° C. and the reaction was carried out for 6 hours. After the completion of the reaction, the reaction mixture was left to stand over a night and filtered off. The thus obtained filtrate was concentrated, whereafter the resulting residue was extracted with benzene and then the extract was treated with water and a diluted alkali solution. The resulting organic layer was dried with anhydrous sodium sulfate, and benzene was removed therefrom and then the resulting residue was recrystallized from ethyl alcohol to obtain 15 g. of a white needle crystal having a melting point of 216 to 217° C. The yield was 85% of the theoretical value.

EXAMPLE 9

Production of O-2'-iso-propoxyethyl O,O-bis-(4-bromophenyl) phosphate

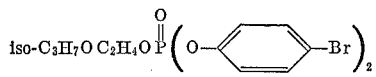

To a mixed solution of 15.5 g. of O-2-isopropoxyethyl dichlorophosphate and 24.2 g. of 4-bromophenol in 300 ml. of toluene was added dropwise gradually 17.6 g. of pyridine while stirring, wherein the reaction mixture was cooled with ice so as to adjust the reaction temperature to 0 to 10° C. Thereafter, the stirring was continued under the same condition for about one hour and further at 50 to 60° C. for 4 hours. After left to stand over a night, the reaction mixture was washed with water and treated with a diluted alkali solution. The resulting organic layer was dried with Glauber's salt and toluene was removed under a reduced pressure, whereafter the residual oily substance was dissolved in n-hexane and crystallized by placing it at a cold portion. Thus, 30 g. of a white powder was obtained. The yield was 87% of the theoretical value.

EXAMPLE 10

Production of O-4'-chlorobutyl O,O-bis-(4-chloro-3-methylphenyl)phosphate

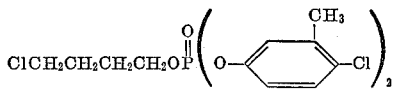

To a mixed solution of 11.3 g. of O-4-chlorobutyl dichlorophosphate and 14.3 g. of 4-chloro-3-methylphenol in 300 ml. of xylene was added dropwise gradually 15 g. of N,N-diethylaniline, while stirring at room temperature. Then, the resulting mass was heated and stirred at 50 to 60° C. for 4 hours. The reaction mixture was cooled, washed with water and treated with a diluted alkali solution. The resulting organic laler was dried with Glauber's salt, and xylene was removed under a reduced pressure and then the residual oily substance was purified by vacuum distillation to obtain 18.5 g. of a slightly yellow and transparent liquid having a boiling point of 200 to 205° C./0.005 mm. Hg and $n_D^{20}$ of 1.5489. The yield was 85% of the theoretical value.

EXAMPLE 11

Production of O-2'-thiocyanoethyl O,O-bis-(4-chlorophenyl) phosphate

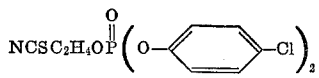

To a mixed solution of 11 g. of O-2-thiocyanoethyl dichlorophosphate and 12.9 g. of 4-chlorophenol in 300 ml. of chloroform was added dropwise gradually 8 g. of pyridine, while cooling with ice and stirring. Thereafter, the resulting mass was reacted at 40 to 50° C. for 4 hours. After the completion of the reaction, the reaction mixture was washed with water and treated with a diluted alkali solution. The resulting organic layer was dried with Glauber's salt, and chloroform was removed under a reduced pressure, whereafter the residual oily substance was distilled off under a reduced pressure to obtain 16 g. of a brown and transparent liquid having a boiling point higher than 140° C./0.0025 mm. Hg and $n_D^{20}$ of 1.5708. The yield was 79.3% of the theoretical value.

EXAMPLE 12

Production of O-4'-chlorobutyl O,O-bis-(2,4,5-trichlorophenyl) phosphate

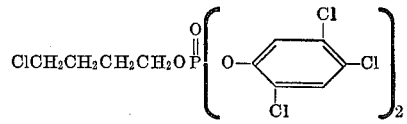

22 g. of sodium 2,4,5-trichlorophenolate was mixed with 300 ml. of acetone and 11.3 g. of O-4-chlorobutyl dichlorophosphate was added dropwise gradually thereto while stirring at room temperature. Then, the resulting mass was heated to 50 to 60° C. and the reaction was carried out for 4 hours. After the completion of the reaction, the reaction mixture was concentrated and the resulting residue was extracted with benzene, washed with water and treated with a diluted alkali solution. The resulting organic layer was dried with Glauber's salt, and benzene was removed under a reduced pressure, whereafter the residual oily substance was purified by vacuum distillation to obtain 22.2 g. of an ochre colour and transparent liquid having a boiling point higher than 203° C./0.006 mm. Hg and $n_D^{20}$ of 1.5641. The yield was 81% of the theoretical value.

EXAMPLE 13

Production of O-2'-chloroethyl O,O-bis-(3-chlorophenyl) phosphate

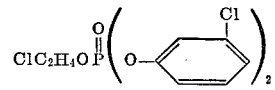

To a mixed solution of 13.8 g. of O-2-chloroethyl dichlorophosphate and 18 g. of 3-chlorophenol in 200 ml. of benzene was added dropwise gradually 14.2 g. of triethylamine, while stirring at room temperature. Thereafter, the stirring was continued under the same condition for some time and further at 50 to 60° C. for 3 hours. After left to stand over a night, the reaction mixture was washed with water and treated with a diluted alkali solution. The resulting organic layer was dried with anhydrous sodium sulfate, and benzene was removed under a reduced pressure, whereafter the resulting residue was purified by vacuum distillation to obtain 23.3 g. of a slightly yellow and transparent liquid having a boiling point of 165 to 175° C./0.01 mm. Hg and $n_D^{20}$ of 1.5538. The yield was 85% of the theoretical value.

EXAMPLE 14

Production of O-2'-chloroethyl O,O-bis-(4-methylphenyl) phosphate

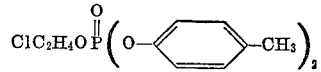

To a mixed solution of 13.8 g. of O-2-chloroethyl dichlorophosphate and 15.2 g. of p-cresol in 200 ml. of toluene was added dropwise gradually 11.2 g. of pyridine, while cooling with water and stirring. The reaction mixture was stirred at 40 to 50° C. for 3 hours and washed with water and then treated with a diluted alkali solution. The resulting organic layer was dried and concentrated, whereafter the residual oily substance was purified by vacuum distillation to obtain 20.7 g. of a colourless and transparent liquid having a boiling point of 145 to 155° C./0.003 mm. Hg and $n_D^{20}$ of 1.5344. The yield was 87% of the theoretical value.

EXAMPLE 15

Production of O-4'-chlorobutyl O,O-diphenyl phosphate

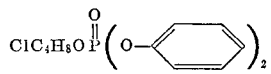

To a mixed solution of 15.8 g. of O-4-chlorobutyl dichlorophosphate and 13.2 g. of phenol in 200 ml. of chloroform was added dropwise gradually 14.2 g. of triethylamine, while stirring at room temperature. Thereafter, the stirring was continued under the same condition for some time and further at 40 to 50° C. for 3 hours. The reaction mixture was washed with water and treated with a diluted alkali solution. The resulting organic layer was dried with anhydrous sodium sulfate, concentrated and then purified by vacuum distillation to obtain 20.1 g. of a colourless and transparent liquid having a boiling point of 182 to 188° C./0.01 mm. Hg and $n_D^{20}$ of 1.5357. The yield was 84.5% of the theoretical value.

EXAMPLE 16

Production of O-2'-iso-propoxyethyl O,O-diphenyl phosphate

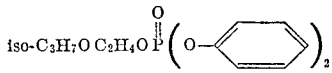

To a mixture of 15.5 g. of O-2-iso-propoxyethyl dichlorophosphate and 13.2 g. of phenol in 200 ml. of benzene was added dropwise gradually 14.2 g. of triethylamine, while cooling with ice. Thereafter, the stirring was continued under the same condition for some time and further at 40 to 50° C. for 4 hours. After left to stand over a night, the reaction mixture was washed with water and treated with a diluted alkali solution. The resulting organic layer was dried, concentrated and then purified by vacuum distillation to obtain 20.9 g. of a light yellow and transparent liquid having a boiling point of 147 to 151° C./0.003 mm. Hg and $n_D^{20}$ of 1.5194. The yield was 89% of the theoretical value.

EXAMPLE 17

Production of O-2'-iso-propoxyethyl O,O-bis-(3-chlorophenyl) phosphate

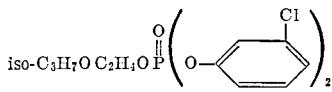

To a mixture of 15.5 g. of O-2-iso-propoxyethyl dichlorophosphate and 18 g. of 3-chlorophenol in 200 ml. of xylene was added dropwise gradually 11.2 g. of pyridine while cooling with water. Thereafter, the stirring was continued under the same condition for some time and further at 40 to 50° C. for 4 hours. After the completion of the reaction, the reaction mixture was washed with water and treated with a diluted alkali solution. The resulting organic layer was dried with anhydrous sodium sulfate, concentrated and then purified by vacuum distillation to obtain 25.7 g. of a yellow and transparent liquid having a boiling point of 178 to 186° C./0.025 mm. Hg and $n_D^{20}$ of 1.5296. The yield was 91% of the theoretical value.

EXAMPLE 18

Production of O-2'-ethoxyethyl O,O-bis-(4-methylphenyl)phosphate

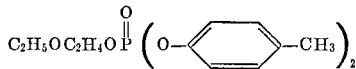

To a mixture of 14.2 g. of O-2-ethoxyethyl dichlorophosphate and 15.2 g. of p-cresol in 200 ml. of benzene was added dropwise gradually 14.2 g. of triethylamine, while cooling with water and stirring. Thereafter, the resulting mass was stirred at 40 to 50° C. for 3 hours. Then, the reaction mixture was washed with water and treated with a diluted alkali solution. The resulting organic layer was dried with anhydrous sodium sulfate, concentrated and then purified by vacuum distillation to obtain 22 g. of a colourless and transparent liquid having a boiling point of 166 to 171° C./0.0025 mm. Hg and $n_D^{20}$ of 1.5189. The yield was 90% of the theoretical value.

EXAMPLE 19

Production of O-2'-n-butoxyethyl O,O-diphenyl phosphate

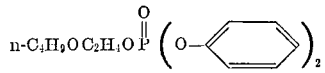

To a mixture of 16.5 g. of O-2-n-butoxyethyl dichlorophosphate and 13.7 g. of phenol in 200 ml. of toluene was added dropwise gradually 11.2 g. of pyridine, while cooling with ice and stirring. Then, the stirring was continued at 40 to 50° C. for 4 hours. After left to stand over a night, the reaction mixture was washed with water and treated with a diluted alkali solution. The resulting organic layer was dried, concentrated and then purified by vacuum distillation to obtain 20.1 g. of a colourless and viscous liquid having a boiling point of 156 to 167° C./0.003 mm. Hg and $n_D^{20}$ of 1.5161. The yield was 82% of the theoretical value.

EXAMPLE 20

A pesticidal composition in the form of dust, containing 4% of the active ingredient was prepared by grinding together 4 parts of O-1,3-dichloro-(2)-propyl O,O-bis-(2,4-dichlorophenyl)phosphate (Example No. 3) and 49 parts of talc and 47 parts of clay as carrier thoroughly so that the active ingredient was uniformly distributed in the carrier.

EXAMPLE 21

A pesticidal composition in the form of wettable powder, containing 20% of the active ingredient was prepared by grinding together 20 parts of O-2'-bromoethyl O,O-bis-(2,4-dichlorophenyl)phosphate (Example No. 7), 35 parts of diatomaceous earth, 10 parts of white carbon, 30 parts of clay and 5 parts of a wetting agent (a mixture of polyalkylaryl polyglycol ethers).

EXAMPLE 22

A pesticidal composition in the form of emulsifiable concentrate, containing 20% of the active ingredient was prepared by dissolving 20 parts of O-2'-ethoxyethyl O,O-diphenylphosphate (Example No. 5), 60 parts of xylene and 20 parts of an emulsifying agent (a mixture of alkylaryl polyglycol ethers and alkylaryl sulfonate).

EXAMPLE 23

A pesticidal composition in the form of granules, containing 7% of the active ingredient was prepared by mixing intimately 7 parts of O-2'-chloroethyl O,O-bis-(2,4-dimethylphenyl) phosphate (Example No. 1), 59 parts of sericite, 30 parts of talc, 1 part of carboxymethyl cellulose, 15 parts of sodium lignin-sulfonate and 0.5 part of a surface active agent (sodium dodecyl sulfonate) together and then the prepared admixture was granulated by adding with a small amount of water and then dried to granules.

The compounds to be used as the active ingredient in the present invention can provide favourable fungicides, insecticides and miticides for agriculture and horticulture by mixing with an apporprate carrier. The carrier may be either solid or liquid. Dust, wettable powder and emulsifiable concentrate may be formed by combining surface active agents and dispersants used generally in preparation of pesticides.

As solid carriers, talc, diatomaceous earth, silica gel and the like may be used and as liquid carriers, acetone and the other solvents to be generally used in preparation of pesticides, such as, eliphatic hydrocarbons and aromatic hydrocarbons may be used.

Furthermore, the active ingredients of the present invention can be mixed with insecticides, such as, 1-naphthyl - N - methylcarbamate (trademark, Sevin), O-O-dimethyl-O-(3-methyl - 4 - nitrophenyl)phosphorothioate (trademark, Sumithion) and BHC or fungicides, such as ferric methane arsonate (trademerak, Neo-Asozin), in order to prevent simultaneously rice blast and rice stem borer (*Chilo suppressalis*); plant hoppers and sheath blight surely.

Then an explanation will be made with respect to examples for preparing the compositions and experimental examples for testing the activity, but the additives and the active ingredients may be varied within a broad scope.

EXAMPLE 24

Test of protective effect for rice blast

An unglazed pot having a diameter of 9 cm. planted with 20 plants of 4–5 leaf stage of young rice plants (species: AICHI ASAHI) was mounted on a turntable and on the rice plants was sprayed a dispersion obtained by diluting the composition prepared in Example 14 with water under a spraying pressure of 0.5 kg./cm.$^2$ by means of a spray gun in an amount of 30 ml. per pot.

24 hours after the spraying, a suspension of rice blast spores obtained by successively inoculating on rice plant in a wet chamber and adjusting the concentration to contain 20 spores in a visual field (15×10 times) of a microscope, was sprayed on rice plants in an amount of 5 ml. per pot.

After the inoculation, the pot was placed in a wet chamber (saturated humidity, 24° C.) made of vinyl sheet for 24 hours and then transferred into a greenhouse which was kept at a high temperature to propagate diseased spots. Seven days after the inoculation the number of diseased spots was counted with respect to 10 leaves per pot to calculate the protective effect. The obtained results are shown in the following Table 1.

The protective effect is calculated as follows:

$$\text{Protective effect (percent)} = \frac{\begin{pmatrix}\text{number of diseased}\\\text{spots in untreated pot}\end{pmatrix} - \begin{pmatrix}\text{number of diseased}\\\text{spots in treated pot}\end{pmatrix}}{\text{number of diseased spots in untreated pot}} \times 100$$

TABLE 1

[Experimental result (Protective effect)]

| Active compound tested | Concentration (p.p.m.) | Controlling value (percent) |
|---|---|---|
| Example: | | |
| 1 | 500 | 95.0 |
| 2 | 500 | 100 |
| 3 | 500 | 99.0 |
| 4 | 500 | 95.0 |
| 5 | 500 | 83.6 |
| 6 | 500 | 96.3 |
| 7 | 500 | 100 |
| 8 | 500 | 98.4 |
| 9 | 500 | 96.7 |
| 10 | 500 | 86.7 |
| 11 | 500 | 99.0 |
| 12 | 500 | 96.7 |
| 13 | 500 | 97.2 |
| 14 | 500 | 100 |
| 15 | 500 | 96.5 |
| 16 | 500 | 100 |
| 17 | 500 | 100 |
| 18 | 500 | 94.3 |
| 19 | 500 | 95.8 |
| Comparative—Blastin | 500 | 95.7 |

NOTE.—Blastin is a trademark for pentachlorobenzyl alcohol.

EXAMPLE 25

Test of therapeutic effect for rice blast 20 rice plants were planted on an unglazed pot having a diameter of 9 cm. Rice blast was inoculated successively on 4 to 5 leaf stage of young rice plants (species: AICHI ASAHI) in a web chamber and from the thus treated leaves the diseased spots were gathered.

A suspension of rice blast spores adjusted the concentration to contain 15 spores in a visual field (15×10 times) of a microspoce, was sprayed on rice plants in an amount of 5 ml. per pot. After the inoculation, the pot was placed in a wet chamber (saturated humidity, 24° C.) made of vinyl sheet for two days. A dispersion obtained by diluting the composition prepared in Example 14 with water, was sprayed on the rice plants in the pot mounted on a turntable under a spray pressure of 1.0 kg./cm.$^2$ by using a spray gun in an amount of 50 ml./pot. After the spraying, the pot was placed in a greenhouse kept at a high temperature to propagate diseased spots and 7 days after the inoculation, the number of deactivated diseased spots and the propagating diseased spots were counted with respect to 10 leaves per pot and the therapeutic effect was calculated. The obtained results are shown in the following Table 2.

The therapeutic effect is calculated as follows:

$$\text{Therapeutic effect (percent)} = \frac{\text{Number of deactivated diseased spots}}{\text{total number of diseased spots}} \times 100$$

TABLE 2

[Experimental result (Therapeutic effect)]

| Active compound tested | Concentration (p.p.m.) | Controlling value (percent) |
|---|---|---|
| Example: | | |
| 2 | 500 | 97.3 |
| 4 | 500 | 90.3 |
| 7 | 500 | 96.7 |
| 8 | 500 | 96.3 |
| 11 | 500 | 99.8 |
| 16 | 500 | 100 |
| Comparative—BLA-S® | 20 | 95.7 |

NOTE.—BLA-S® is a trademark for Blasticidin-S-benzyl-aminobenzene sulfonate.

EXAMPLE 26

Test for insecticidal effect for house flies (*Musea domestica*)

Each of solutions of the compounds of the present invention as shown in the following Table 3 in acetone was applied on the breast portion and the back portion of adults (female) of house flies 4 days after the emergence, the mortality was determined after 24 hours. An amount of the active compound treated per house fly was 10γ. The number of flies tested was 40 per 1 concentration. The obtained results are shown in the following Table 3.

TABLE 3.—EXPERIMENTAL RESULT

| Active compound tested: | Mortality (percent) |
|---|---|
| Example 1 | 90.4 |
| Example 2 | 92.7 |
| Example 3 | 97.6 |
| Example 4 | 98.3 |
| Example 5 | 96.8 |
| Example 6 | 91.2 |
| Example 9 | 96.6 |
| Example 11 | 89.8 |
| Comparative DDT | 63.5 |

EXAMPLE 27

Test of miticidal effect for carmine mite (*Tetranychus telorium*)

0.025% dispersion of the composition prepared in Example 10 in water was sprayed on leaves of bean, on which adult of carmine mite was being grown, and mortality after 48 hours was determined. The number of adults to be tested was 40 to 60. The obtained results are shown in the following Table 4.

TABLE 4.—EXPERIMENTAL RESULT

| Active compound tested: | Mortality (percent) |
|---|---|
| Example 1 | 82.6 |
| Example 2 | 89.3 |
| Example 3 | 93.4 |
| Example 4 | 94.8 |
| Example 5 | 96.5 |
| Example 6 | 85.2 |
| Example 7 | 97.9 |
| Example 8 | 100 |
| Example 9 | 91.7 |
| Example 10 | 89.3 |
| Example 11 | 96.5 |
| Example 12 | 83.2 |
| Comparative Galecron [1] | 83.6 |

[1] Galecron is a trademark for N-(2-methyl-4-chlorophenyl)-N',N'-dimethylformamidine.

What is claimed is:

1. A method killing fungi which comprises applying thereto fungicidally effective amount of a compound of the formula

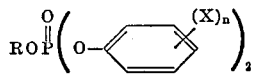

wherein R is lower alkyl having 2 to 4 carbons substituted with one to three of the groups selected from the group consisting of chlorine, bromine, cyano, thiocyano and uower alkoxy having 2 to 4 carbons having 1 to 4 carbon atoms, X is selected from the group consisting of hydrogen, chlorine, bromine and methyl and $n$ is an integer of 1 to 5.

2. A method according to claim 1, wherein R is lower alkyl substituted with one to three halogens selected from the group consisting of chlorine and bromine.

3. A method according to claim 1, wherein R is lower alkyl substituted with cyano.

4. A method according to claim 1, wherein R is lower alkyl substituted with thiocyano.

5. A method according to claim 1, wherein R is lower alkyl substituted with alkoxy.

6. A method according to claim 1, wherein said compound is O-2'-ethoxyethyl-O,O-diphenyl phosphate.

References Cited

OTHER REFERENCES

| 3,242,042 | 3/1966 | Chupp | 424—210 |
| 3,299,188 | 1/1967 | Schicke | 424—210 |

ALBERT T. MEYERS, Primary Examiner

V. D. TURNER, Assistant Examiner

U.S. Cl. X.R.

424—210, 225